(12) United States Patent
Vild et al.

(10) Patent No.: US 6,217,823 B1
(45) Date of Patent: Apr. 17, 2001

(54) METAL SCRAP SUBMERGENCE SYSTEM

(75) Inventors: Chris T. Vild, Cleveland Heights, OH (US); Jan H. L. van Linden, Pittsburgh, PA (US)

(73) Assignee: Metaullics Systems Co., L.P., Solon, OH (US)

( * ) Notice: Subject to any disclaimer, the term of this patent is extended or adjusted under 35 U.S.C. 154(b) by 0 days.

(21) Appl. No.: 09/281,240

(22) Filed: Mar. 30, 1999

Related U.S. Application Data
(60) Provisional application No. 60/079,960, filed on Mar. 30, 1998.

(51) Int. Cl.[7] .................................................. C21B 13/00
(52) U.S. Cl. .......................... 266/44; 266/901; 266/216; 75/687
(58) Field of Search .................. 75/686, 687; 266/233, 266/216, 900, 901, 275, 45, 44

(56) References Cited

U.S. PATENT DOCUMENTS

| | | |
|---|---|---|
| 3,873,305 | 3/1975 | Claxton et al. . |
| 3,955,970 | 5/1976 | Claxton et al. . |
| 3,984,234 | 10/1976 | Claxton et al. . |
| 3,997,336 | 12/1976 | van Linden et al. . |
| 4,128,415 | 12/1978 | van Linden et al. . |
| 4,286,985 | 9/1981 | van Linden et al. . |
| 4,491,474 | 1/1985 | Ormesher . |
| 4,930,986 | 6/1990 | Cooper . |
| 5,435,527 | * 7/1995 | Margaria .............................. 266/216 |
| 6,036,745 | * 3/2000 | Gilbert et al. .......................... 75/686 |

FOREIGN PATENT DOCUMENTS

| | | |
|---|---|---|
| 2 212 603 | 7/1989 | (GB) . |
| 2 269 889 | 2/1994 | (GB) . |

\* cited by examiner

*Primary Examiner*—Scott Kastler
(74) *Attorney, Agent, or Firm*—Fay, Sharpe, Fagan, Minnich & McKee, LP

(57) ABSTRACT

A metal scrap submergence device comprising an open top chamber including walls of a heat resistant material, an inlet positioned in a side wall of the chamber, an outlet positioned in the base of said chamber, and a ramp adjacent said side wall of the chamber.

20 Claims, 3 Drawing Sheets

METAL SCRAP SUBMERGENCE SYSTEM

This application claims benefit of provisional application No. 60/079,960 filed Mar. 30, 1998.

BACKGROUND OF THE INVENTION

The present invention is directed to a scrap submergence system of the type typically employed in metal recycling processes, particularly, the recycling of aluminum. In the recycling of metals, it is necessary to melt scrap pieces for treatment and processing. A large portion of the aluminum scrap pieces are thin walled as a result of the mechanical shaping action from which they are formed, such as, shaving, boring and cold rolling. Melting thin walled scrap pieces is particularly difficult because, (i) extended exposure to the hostile atmosphere in a traditional melting furnace results in extremely high oxidation loss and, (ii) rapid submerging in molten metal is severely hampered by the fact that thin walled scrap pieces float on molten metal ("floating scrap").

In a typical melting operation used to convert floating scrap to ingot, a melting furnace is provided with an enclosed hearth and a connected open sidewell. Usually the sidewell is divided into a pump well and a melting bay. A pump or other molten metal flow inducing apparatus is positioned externally to the melting bay (e.g., in the pump well), and causes molten metal to flow from the hearth to the melting bay. Typically the melting bay is further divided into a chargewell and a drosswell. Metal scrap pieces are fed into the melting bay, particularly the chargewell component thereof.

A variety of apparatus have been used in the melting bay (specifically in the chargewell) to facilitate the submergence of the scrap metal below the surface of the molten metal bath. Three major types of systems exist. The first type includes mechanical systems constructed primarily of a rotor which creates a molten metal flow from the top surface. Examples of these devices are shown in U.S. Pat. Nos. 3,873,305; 3,997,336; 4,128,415; and 4,930,986. The second type of system uses a mechanical device to physically push the scrap below the melt surface (elephant feet/well-walkers). The third type of system relies on the shape of the chamber without rotation of a rotor to create a metal flow which submerges scrap pieces in the chargewell. Particularly, the flow of molten metal into the chargewell is manipulated in such a manner to achieve a vortex which draws chips from the top surface into the bath. These systems include, for example, U.S. Pat. Nos. 3,955,970; 3,984,234; 4,286,985; and U.S. Ser. No. 08/784,832, each of which is herein incorporated by reference. The present invention is directed to this third type of scrap submergence system. However, the present invention is directed to a novel system which achieves a high charge rate and a high recovery rate with minimal maintenance requirements (three important requirements).

While the present invention is directed to the third class of submergence devices, the present invention contrasts the traditional design by achieving a vortex with an initially upward flow of metal adjacent the outer walls of the feed bay. In contrast, in U.S. Pat. No. 4,286,985, a chargewell includes a top inlet and a bottom outlet which are positioned to create a downward flow of molten metal adjacent the side walls of the well to form a vortex. Similarly, with reference to U.S. Ser. No. 08/784,832, a chargewell is designed to include a unique wedge positioned on one of the walls of the feed bay to create a downward flow of molten metal and the vortex. In both systems, the intention of the design is to create a downward flow in the molten metal pattern as it circles to form the vortex pattern within the charge well.

SUMMARY OF THE INVENTION

Accordingly, it is a primary object of this invention to provide a new and improved metal scrap submergence device.

It is an advantage of this invention to provide a new and improved scrap submergence system that can function without mechanically moving components.

A still further advantage of this invention is to provide a new and improved metal scrap submergence device that improves the efficiency of scrap submergence.

Another advantage of this invention is to provide a new and improved scrap submergence device that is effective with floating scrap pieces.

A further advantage of the invention is associated with the use of an easy to manufacture body without moving parts—which provides longevity. In addition, the invention is easy to maintain/clean and minimizes the required working depth of molten metal.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention as embodied and broadly described herein, the scrap submergence device of this invention comprises an open top chamber including walls constructed of a heat resistant material. The chamber includes an inlet positioned in a side wall and an outlet positioned in its base. Generally, the chamber can be described as a bottom inlet, bottom outlet arrangement. A ramp is formed adjacent the walls of the chamber, spiraling upwardly thereon.

Preferably, the metal scrap submergence device will be constructed in a manner which positions the bottom edge of the ramp on the base of the chamber adjacent the inlet. In a particularly preferred form of the invention, the ramp will spiral through at least 180°, and preferably 270°, of the chamber circumference. In a particularly preferred form of the invention, the ramp will include a portion having a slope of about 5°, and preferably 10° to 15°. However, it should be understood that the slope can vary throughout the dimensions of the ramp. In fact, the geometry of the preferred embodiment (cylindrical) is such that the outer edge of the ramp adjacent the wall and inner edge of the ramp have the same rise, but cover slightly different distance. Hence, the outer edge and the inner edge of the ramp will exhibit correspondingly different slopes—the outer edge being somewhat less than the inner edge. Accordingly, reference herein to slope can refer to the lesser point along the outer edge.

In a further preferred embodiment of the invention, a wall will extend from the inner edge of the ramp, helping to define an entrance to the outlet. Preferably, the top edge of the wall will be at approximately the same height as the terminal edge of the ramp.

BRIEF DESCRIPTION OF THE DRAWINGS

The invention consists in the novel parts, construction, arrangements, combinations and improvements, shown and described. The accompanying drawings, which are incorporated in and constitute a part of the specification illustrate one embodiment of the invention and together with the description, serve to explain the principles of the invention. Of the Drawings.

DETAILED DESCRIPTION OF THE INVENTION

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined by the appended claims.

Figure 1:
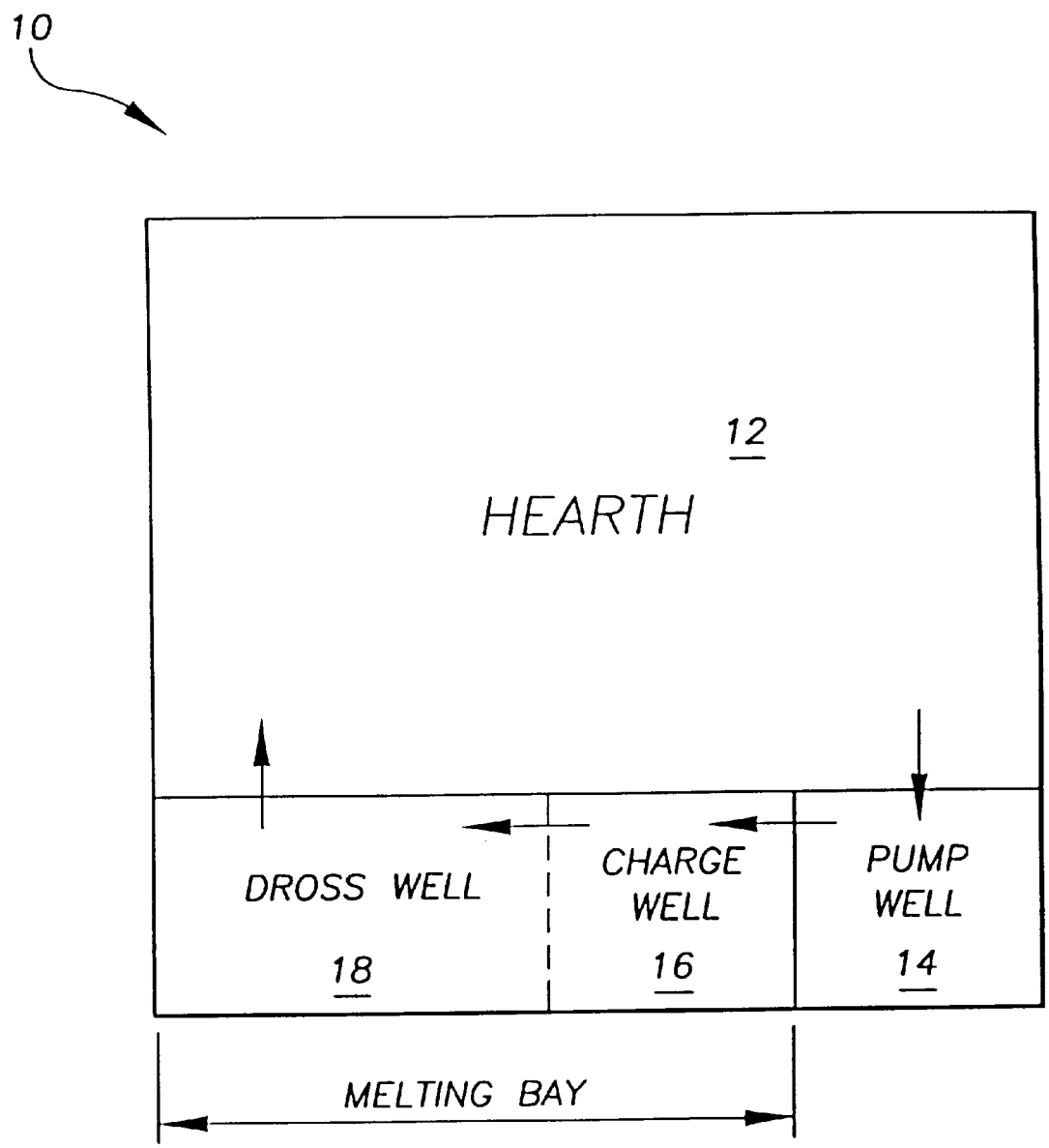
FIG. 1 is a schematic representation of a molten metal recycling furnace.

Referring now to FIG. 1, an aluminum recycling furnace 10 is depicted. Furnace 10 includes a main hearth component 12 which is heated, for example, with gas or oil burners or by any other means known in the art. Adjacent, and in fluid communication with the hearth 12, is the primary recycling area comprised of a pump well 14, a charge well 16 and a dross well 18. Although not shown, the walls of the hearth 12 opens to the pump wall 14, to the chargewell 16, to the dross well 18, and again to the hearth 12 to allow the circulation pattern shown by arrow 5. The pump well includes a molten metal pump of any type known to those skilled in the art. The molten metal pump circulates molten metal from the hearth 12 to the charge well 16 where scrap chips of the metal to be recycled are deposited onto the surface of the melt. Molten metal from the charge well 16 flows into the dross well 18 wherein impurities in the form of dross are skimmed from the surface before the melt flows back into the hearth 12. This particular invention is directed to an improved design of the charge well 16, i.e., a bottom inlet—bottom outlet design.

Figure 2:
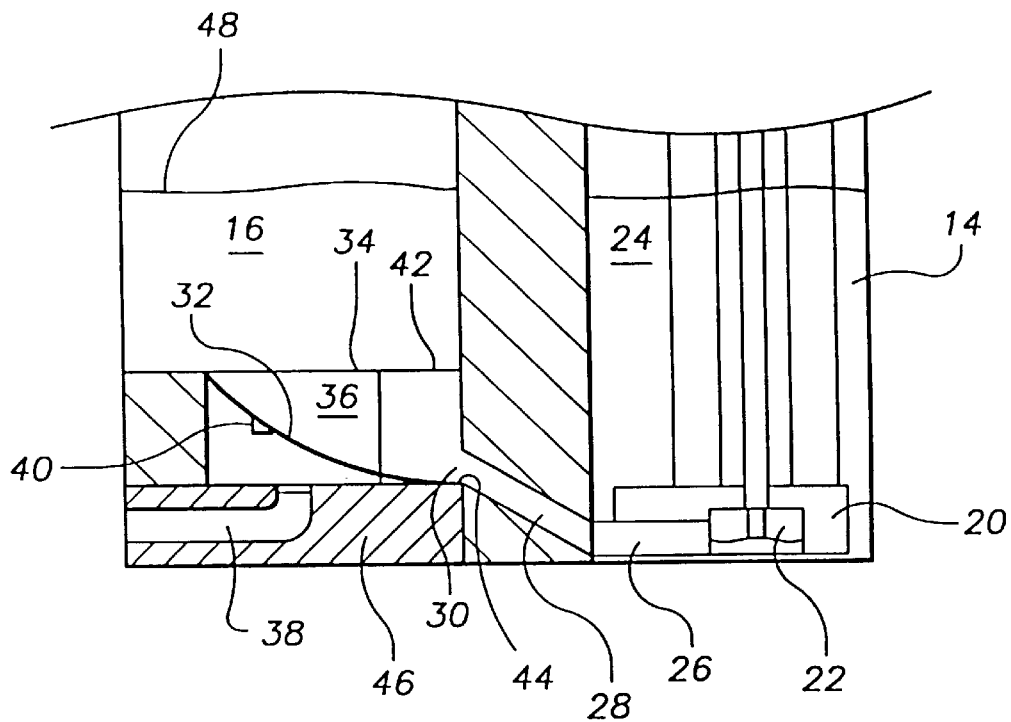
FIG. 2 is a cross-sectional view of the pump well and charge well components of the furnace of FIG. 1.
Figure 3:
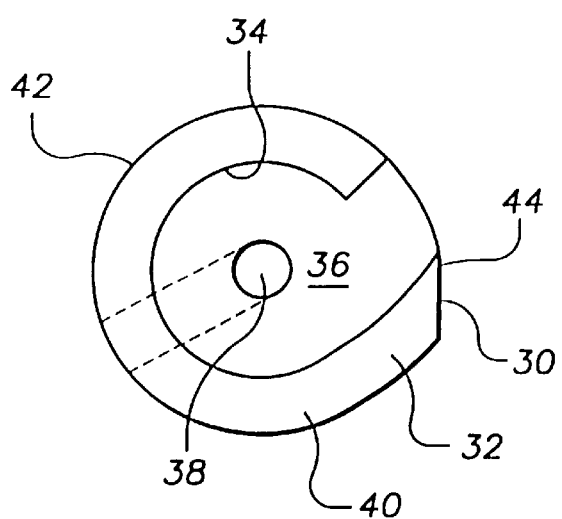
FIG. 3 is a top plan view of the charge well of FIG. 2.

Referring now to FIG. 2, side elevation view in cross-section of the pump well 14 and charge well 16 of FIG. 1 is provided. Specifically, pump 20 is positioned in pump well 14 and draws molten aluminum from the hearth 12 forcing it into the charge well 16. Referring also to FIG. 3, it can be seen that rotation of impeller 22 draws molten aluminum from the bath 24, into the pump 16 and forces it through outlet 26, up passage 28, and through inlet 30 into the charge well 16. Molten aluminum flows up the ramp 32 within charge well 16, spilling over an inner edge 34 into cavity 36 and exiting through outlet 38. It is preferred that the leading edge 44 of the ramp 32 be positioned adjacent the inlet 30 to the charge well 16.

While it is a beneficial that the ramp 32 be sloped, this does not need to be achieved by a constant incline. Rather, as shown in the embodiment of FIGS. 2 and 3, ramp 32 is sloped over a first 180° portion 40, but is horizontal over the final about 120° portion 42. Accordingly, the invention is intended to encompass all versions of a sloped ramp. Similarly, the invention is intended to encompass a ramp covering from as little as 45° of the circumference of the charge well 16 to 360°. However, it is preferred that the ramp extend between 180° and 270°.

Because the present invention is applicable as a component for remodeling existing charge wells, it can be noted from FIG. 2 that the design includes a base section 46 of refractory material which elevates the cavity 36 to provide clearance for an outlet 38 and allows molten metal to flow into the dross well 18 of FIG. 1. As is recognized by those of ordinary skill in the art, metal chips being recycled are deposited onto the surface of the melt 48 in charge well 16.

Figure 4:
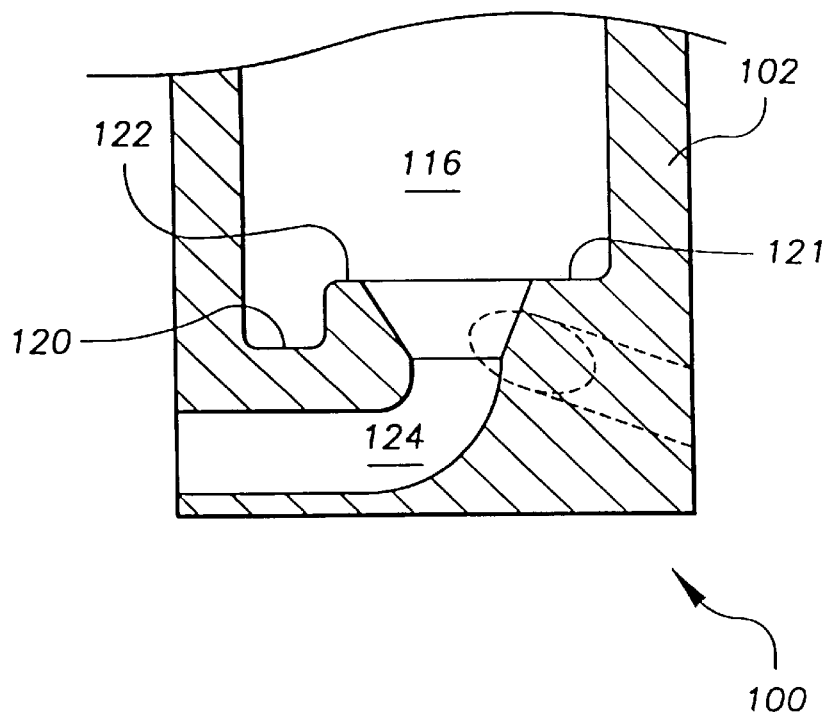
FIG. 4 is a cross-sectional view of an alternative embodiment of the inventive charge well.
Figure 5:
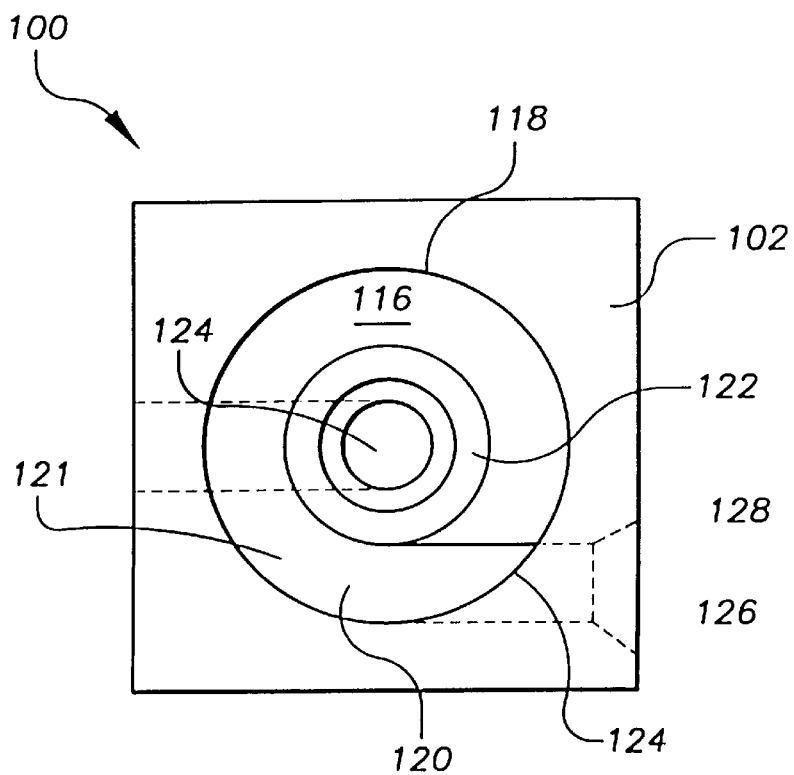
FIG. 5 is a top plan view of the charge well of FIG. 4.

Referring now to a alternative embodiment of the invention, reference is made to FIGS. 4 and 5. In this embodiment, a scrap melting device 100 is comprised of a block of refractory material 102 which is constructed of a size suited to provide a relatively close tolerance mating with the dimensions of an existing charge well (e.g. charge well 16 of FIG. 1). Preferably, the block 102 is constructed of a cured material such as an alumina-silica refractory or other castable refractory material known to those skilled in the art. In a preferred form of the invention, the surfaces of the cast body will be treated with boron nitride prior to heat treatment. Referring again to FIGS. 4 and 5, block 102 includes a chamber 116 having generally cylindrical side wall 118, a base 120 including ramp 121, with an inner wall 122 forming a centrally located cavity 123 leading to outlet 124 and outlet duct 125. Ramp 121 again begins with a leading edge 124 adjacent the inlet 126 to the chamber 116. In this instance, inlet 126 includes a tapered opening 128.

While not wishing to be bound by theory, it is believed that the present invention provides superior results by the creation of an upward flow adjacent the outer walls of the chamber and a downward vortexing flow in the center portion of the chamber resulting in a folding action at the interface of the upward-downward flows. It has been found that this design improves the pounds of scrap melted per hour and the variety of the scrap particulate which can be submerged in the molten metal bath.

Molten metal scrap, particularly aluminum, can be difficult to submerge based on a variety of characteristics such as the size of the scrap particles and the presence of oil or other organic material on its surface. More specifically, piece size and organic content can strongly influence the buoyancy of the material and adversely effect the ability of the scrap submergence system to submerge the scrap. In this regard, scrap which is not submerged and floats on the top will typically not melt, and may in fact burn. Accordingly, rapid submergence of scrap particles is an essential characteristic of any system. As stated above, the present invention is believed to achieve superior results because of fluid folding. Moreover, waves are collapsing, and in this case, in a centripetal rather than linear configuration. This folding wave action is beneficial because it covers unmelted scrap resulting in increased scrap charge rates.

However, it is not intended to limit this invention to this flow pattern because the device has been found to be very effective even when this folding action is not demonstrated. Moreover, an additional characteristic of the present invention is a creation of a vortex having a large surface area. In theory, the more surface area provided by the vortex, the more exposed area available upon which to effectively drop scrap metal pieces. In addition, the vortex in the present system is wide, but not too deep. If the vortex is too deep, there is a chance that air is trapped causing excessive oxidation of the metal.

The following examples are provided to facilitate the explanation of the invention but are not intended to limit the invention to the specific embodiments disclosed therein.

EXAMPLES

Water Modeling

Water modeling tests of the present system were conducted to evaluate the submergence performance and optional ramp angles. Specifically, a submergence well of the type depicted in FIGS. 2 and 3 was created. Performance was evaluated based on the downward fluid force acting on the surface of the vortex. Pump flow rate, liquid depth and other operating conditions were consistent with molten metal industry standards. Generally, the best performance was with a 5 to 10 degree ramp angle, however, submergence was achieved through varying degree of angles.

Molten Metal Evaluations

A charge well of the type depicted in FIGS. 4 and 5 was constructed of Premier Aluguard 60 and evaluated in a molten metal furnace of the type depicted in FIG. 1. Again, using conditions consistent with molten metal industry standards, the performance was measured. Performance was evaluated based on the effective submergence and melting of light gage scrap, maintenance requirements of the system, and speed at which the scrap was submerged in order to avoid oxidation.

Scrap submergence rates were seen to be very high and they surpassed even the melting capacity of the furnace. In several tests, submergence rates of up to 10,000 lbs. per hr. of low density scrap were achieved using a Metaullics L35SD pump running at about 600 rpm.

The speed of submergence was excellent, giving no evidence of oxidation of the scrap in the charge well. Melt loss due to oxidation was measured and found to be substantially below what is generally acceptable in the industry. Particularly, while recovery rates or melt loss are equally or more important than production rates, they are much more difficult to quantify and confuse in production environments. Additionally, their definition, both in mathematical and general approach varies greatly from plant to plant. Further complicating such an analysis, these results are not readily shared since their financial impact on a plant is a vital component. Accordingly, contrasting these values for different operations can be difficult. Factors such as scrap thickness, magnesium content, and melt temperatures can greatly influence the result. Finally, the type of scrap submergence system also has a large impact on recovery. In addition, minimizing maintenance downtime is a long-term advantage which cannot be quantified in a short-term trial.

Taking into account the vagaries of any submergence analysis, the present invention was evaluated in a two ton charge trial wherein the recovery rate was quantified using a melt loss calculation. To the charge was added 160 lbs. of flux salt. After appropriately conditioning the melt according to standard melt practices, 237 lb. of dross was removed. The additional material obtained in the dross equals 77 lbs. or roughly 2% melt loss. It is believed this result may be an improvement over a popular submergence system comprised of mechanical elements used to push scrap below the surface of the melt in the chargewell, assuming identical scrap material was used. If such a melt loss can be maintained throughout the life of the system, and such a melt loss provides even a 1% improvement over prior apparatus, the inventive system in a plant producing 15 million pounds per month achieves a $100,000 monthly revenue increase at the current day price of $0.67 per pound for aluminum. Additionally, the plant should have a lower dross reclaiming cost since there are fewer pounds of dross generated.

Demonstrating further advantages of the present invention, the charge well remained maintenance free over a long production cycle and showed no residual material left in the charge well during periods of stopped production.

Thus, it is apparent that there has been provided, in accordance with the invention, a scrap submergence device that fully satisfies the objects, aims, advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed:

1. A metal scrap submergence device comprising an open top chamber including side and base walls of a heat resistant material, an inlet in a side wall of the chamber for receiving molten metal, an outlet in the base of said chamber, and a ramp adjacent said side wall of the chamber.

2. The submergence device of claim 1 wherein said inlet is at about the same horizontal level within said chamber as said outlet.

3. The submergence device of claim 1 wherein said ramp includes a leading edge proximate the inlet.

4. The submergence device of claim 1 wherein said chamber is formed on top of a block of said refractory material, an outlet duct being provided in said block and in fluid communication with said chamber outlet.

5. The submergence device of claim 1 wherein said ramp traverses at least 180° of said chamber wall.

6. The submergence device of claim 5 wherein said ramp traverses at least 270° of said chamber wall.

7. The ramp of claim 1 including a substantial portion having a slope of at least about 5°.

8. The submergence device of claim 1 wherein a wall extends from an inner face of said ramp to define an entrance to said outlet.

9. The submergence device of claim 8 wherein said wall extends 360° to form a passage.

10. The submergence device of claim 9 wherein said passage is cylindrically shaped.

11. The submergence device of claim 9 wherein said passage tapers to about an equivalent diameter as said chamber outlet.

12. The scrap submergence device of claim 1 being comprised of a refractory material.

13. The scrap submergence device of claim 1 including a pump to provide molten metal flow to the inlet.

14. The scrap submergence device of claim 1 wherein said ramp is further adjacent the base of the chamber to achieve upward flow of the molten metal.

15. The scrap submergence device of claim 7 wherein the ramp includes a portion having a slope of at least about 10°.

16. A metal scrap submergence device comprising a body of heat resistant material including a base and side wall defining an open top cylindrical chamber, an inlet to said chamber in the side wall, an outlet in a bottom of said chamber leading to an outlet duct in said base providing a fluid exit from said device, a ramp adjacent said side wall of the chamber, said ramp traversing at least one half a perimeter of said side wall, said ramp including a first edge proximate said bottom of the chamber and adjacent said inlet and generally spiraling around a cylindrical opening formed by an inner wall of said ramp.

17. A method of melting metal scrap comprising depositing metal pieces onto a molten metal bath in an open top chamber including walls of a heat resistant material, an inlet positioned in a side wall of the chamber, an outlet positioned in the base of said chamber, and a ramp adjacent said side wall of the chamber, pumping molten metal into said inlet and upwardly along the ramp to create a vortex in said bath which draws said metal pieces into said bath.

18. A metal scrap submergence device comprised of a body of heat resistant material including a base and a side wall defining an open top cylindrical chamber, an inlet to said chamber in a side wall adjacent said base, an outlet to said chamber in approximately the center of the said base, and a means for achieving an upward flow of molten metal from the inlet.

19. The scrap submergence device of claim 18, wherein the molten metal exits downwardly through the outlet after the molten metal has reached its highest elevation in the cylindrical chamber.

20. A recycling furnace comprising:

a charge well having a scrap submergence device, said scrap submergence device having an open top chamber including side and base walls of a heat resistant material, an inlet in a side wall of the chamber for receiving molten metal, an outlet in the base of said chamber, and a ramp adjacent said side wall of the chamber.

* * * * *